United States Patent [19]

Bergesio

[11] 4,453,564
[45] Jun. 12, 1984

[54] FUEL TANK FOR MOTOR VEHICLES

[75] Inventor: Giovanni Bergesio, Valfenera, Italy

[73] Assignee: Fiat Auto S.p.A., Turin, Italy

[21] Appl. No.: 366,617

[22] Filed: Apr. 8, 1982

[30] Foreign Application Priority Data

Apr. 16, 1981 [IT] Italy .............................. 53149/81[U]

[51] Int. Cl.³ ..................... B65D 87/12; B65D 87/46; F17D 1/00
[52] U.S. Cl. .................................. 137/574; 137/576; 137/590; 220/22
[58] Field of Search ...................... 137/590, 574, 576; 220/22, 86 R

[56] References Cited

U.S. PATENT DOCUMENTS

| | | | |
|---|---|---|---|
| 1,701,490 | 2/1929 | Carter | 220/22 |
| 2,464,827 | 3/1949 | Noyes | 137/576 |
| 3,020,950 | 2/1962 | Schraivogel | 137/574 |
| 4,179,036 | 12/1979 | Pasini | 220/22 |
| 4,185,750 | 1/1980 | Op den Camp | 220/22 |

*Primary Examiner*—A. Michael Chambers

*Attorney, Agent, or Firm*—Sughrue, Mion, Zinn, Macpeak & Seas

[57] ABSTRACT

A fuel tank for motor vehicles, provided internally with a fuel feed pipe for connection to a fuel supply system of a motor vehicle engine, includes an inner wall extending between the lower wall and the upper wall of the tank, and surrounding the fuel feed pipe to define a chamber having a smaller capacity than the capacity of the tank and containing the fuel feed pipe. This chamber communicates with the remaining part of the tank through apertures in the inner wall. The tank is constituted by lower and upper plastics half shells which are welded together and have opposing main walls which define the lower wall and the upper wall of the tank respectively. The lower and upper half shells are provided with ribs which project into the tank, the ribs projecting from the opposing main walls being in contact with one another so as to define the inner wall. This inner wall prevents the fuel from all collecting in a peripheral zone of the tank due to longitudinal or transverse accelerations and decelerations of the vehicle during movement, even when the tank is not completely full, thereby ensuring a constant supply of fuel to the engine through the fuel feed pipe.

2 Claims, 8 Drawing Figures

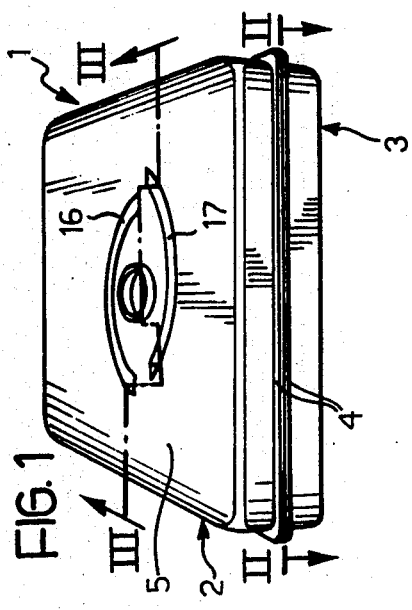
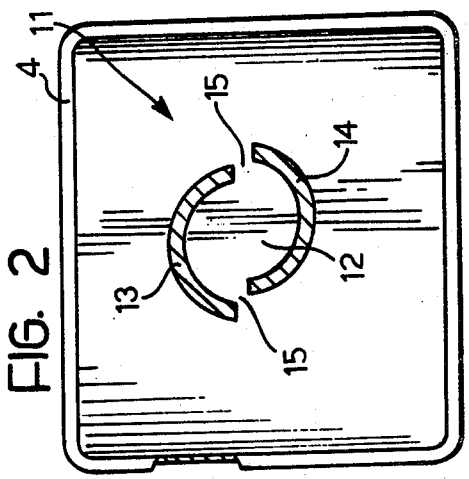
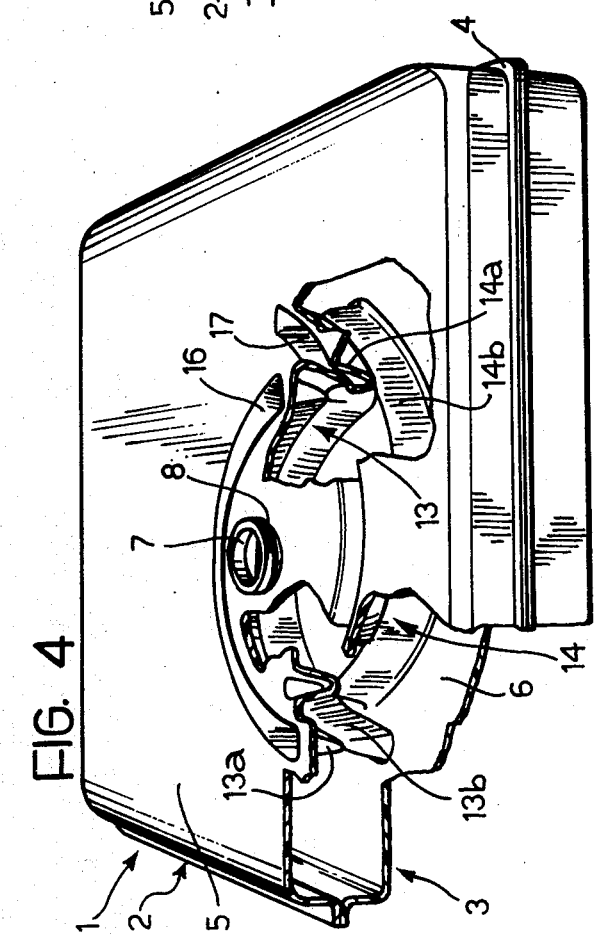
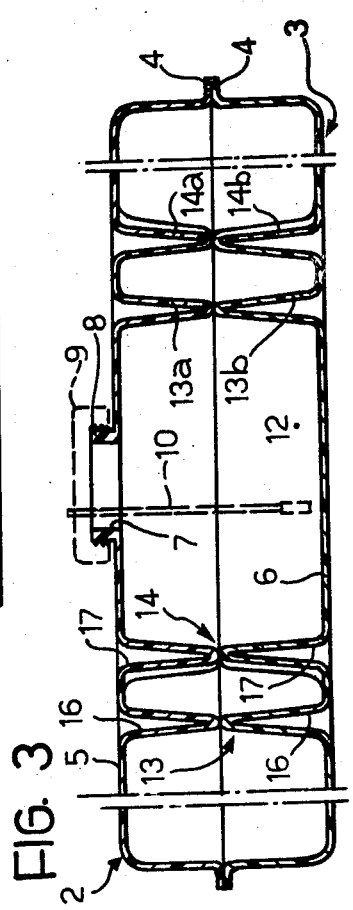

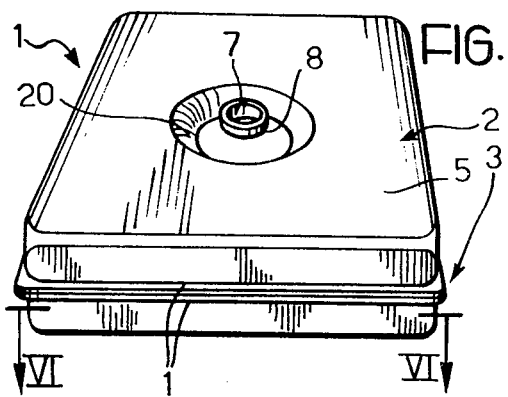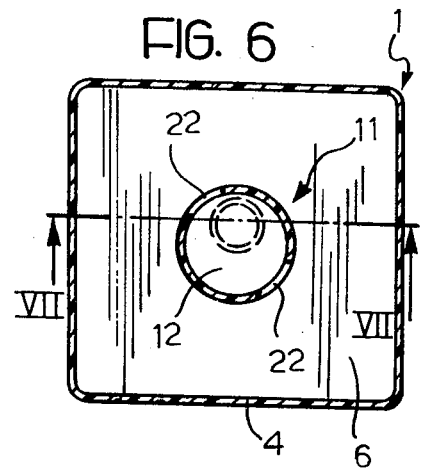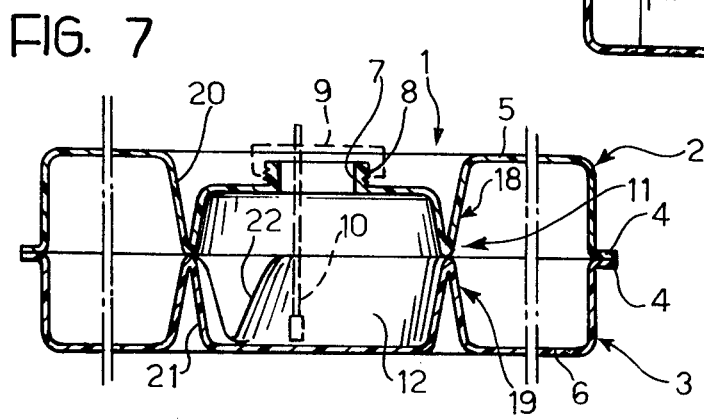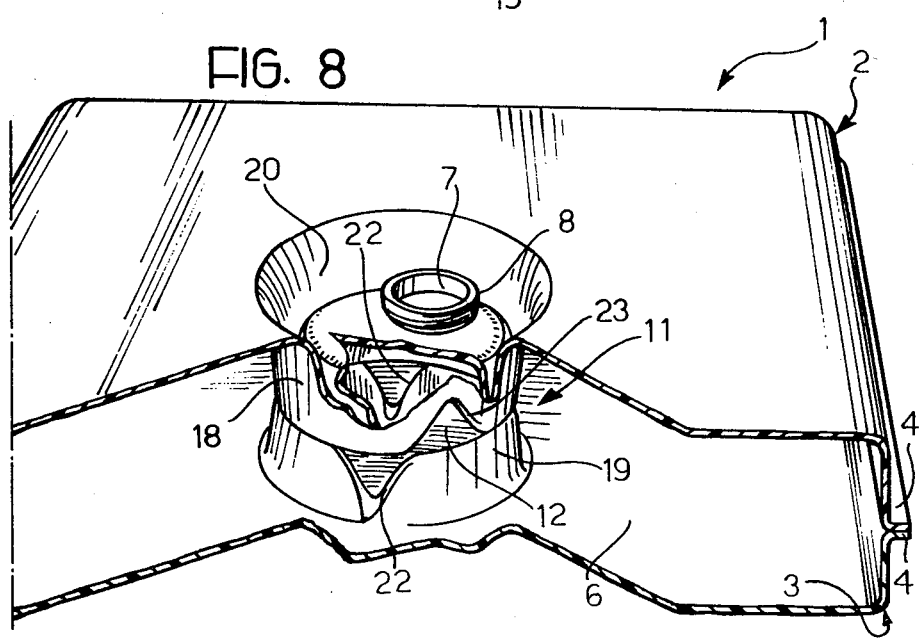

FUEL TANK FOR MOTOR VEHICLES

The present invention relates to a fuel tank for motor vehicles, of the type provided internally with a fuel feed pipe for connection to the fuel supply system of a motor vehicle engine.

The object of the invention is to provide a fuel tank for motor vehicles which ensures a constant supply of fuel to the engine through the fuel feed pipe, even when the tank is not completely full and when the fuel contained therein would tend to collect in a peripheral zone of the tank because of transverse and longitudinal accelerations and decelerations to which the vehicle is subjected during movement.

With a view to achieving this object, the subject of the present invention is a fuel tank of the above specified type, characterised by the fact that the tank includes an inner baffle wall extending between the lower and upper walls of the tank, and surrounding the said fuel feed pipe so as to define a chamber having a reduced capacity with respect to the capacity of the tank and containing the fuel feed pipe, said chamber communicating with the remaining part of the tank through apertures in the said inner wall.

According to a further characteristic, the tank is constituted by a lower half shell and an upper half shell which are welded together, are both made of plastics material, and have opposing main walls which repectively define the lower wall and the upper wall of the tank and are and provided with ribs projecting into the tank, the ribs projecting from these opposing main walls being in contact with one another to define the said inner baffle wall.

Because of characteristic, the tank according to the invention is of simple and economic construction. Moreover, the said ribs, as well as constituting the inner baffle wall which delimits the chamber of reduced capacity, also serve as reinforcing ribs.

In another aspect, the said ribs have a V-shaped section and correspond to grooves formed in the outer surfaces of the upper and lower walls of the tank.

In a first embodiment, the said inner baffle wall includes two semi-annular wall portions the concave sides of which face one another, each of these semi-annular wall portions having an end disposed within the concavity of the other semi-annular wall portion adjacent to a corresponding end thereof, the said apertures being defined by passages between the adjacent ends of the semi-annular wall portions.

In a second embodiment, the said inner baffle wall surrounding the fuel feed pipe comprises an annular wall constituted by two corresponding annular ribs projecting into the tank from the upper and lower walls respectively of the latter. The edge of each annular rib which is disposed in contact with the other annular rib has recesses defining the said apertures for the communication of the chamber containing the fuel fuel pipe with the remaining part of the tank.

Further characteristics and advantages of the present invention will become apparent from the description which follows with reference to the attached drawings, provided by way of non-limitative example, in which:

FIG. 1 is a perspective view of a first embodiment of the tank according to the present invention;

FIG. 2 is a sectional view taken on the line II—II of FIG. 1;

FIG. 3 is a section taken on the line III—III of FIG. 1;

FIG. 4 is a partially-sectioned perspective view of the tank of FIG. 1;

FIG. 5 is a perspective view of a second embodiment of the tank according to the present invention;

FIG. 6 is a sectional view taken on the line VI—VI of FIG. 5;

FIG. 7 is a sectional view taken on the line VII—VII of FIG. 6; and

FIG. 8 is a partially-sectioned perspective view of the tank of FIG. 5.

FIGS. 1 to 4 illustrate a fuel tank 1 constituted by two half shells 2, 3 of plastics material welded together along two peripheral flanges 4. The upper half shell 2 and the lower half shell 3 have opposing main walls 5, 6 which correspond respectively to the upper wall and to the lower wall of the tank.

The upper wall 5 has a central hole 7 having an externally-threaded tubular mouth 8. A closure element 9 is intended to be screwed onto the mouth 8 (being illustrated in broken outline in FIG. 3), the closure element 9 carrying a pipe 10 (also illustrated in broken outline) for feeding fuel from the tank, and also the fuel level detector device and the pipe for returning fuel from the engine to the tank (both of which are not illustrated). The pipe 10 is intended to be connected to the engine fuel supply system.

With reference to FIG. 2, the tank 1 includes an inner baffle wall 11 extending between the upper wall 5 and the lower wall 6 of the tank, and surrounding the fuel feed pipe 10. The inner baffle wall 11 delimits a chamber 12 having a reduced capacity with respect to the total capacity of the tank 1. In the embodiment illustrated in FIGS. 1 to 4, the inner baffle wall 11 comprises two semi-annular wall portions 13, 14. These semi-annular wall portions are positioned with their concave sides facing one another. Moreover, as can be seen in FIG. 2, each semi-annular wall portion has an end disposed within the concavity of the other semi-annular wall portion and adjacent to one end of this latter. In this way, the adjacent ends of the semi-annular wall portions 13, 14 define passages 15 allowing communication between the chamber 12 of reduced capacity and the remaining part of the tank.

The wall portions 13, 14 are constituted by ribs projecting into the interior of the tank from the opposing main walls 5, 6 of the two plastics half shells 2, 3. The ribs projecting from these opposing walls are welded together so as to constitute the said wall portions 13, 14. These ribs are indicated 13a, 14a and 13b, 14b respectively in FIGS. 3 and 4. As can be seen in these Figures, the said ribs, which are formed upon moulding of the two plastics half shells 2, 3, have a V-shaped section and correspond to grooves 16, 17 formed in the outer surface of the upper wall 5 and the lower wall 6 of the tank.

The inner baffle wall 11 serves to resist the tendency of the fuel contained in the tank to collect in a peripheral zone of the latter when, during movement, the vehicle is subjected to longitudinal or transverse accelerations or decelerations (starting off, stopping, and turning). In this way, it is ensured that, even when the tank is not completely full, a quantity of fuel sufficient to maintain the lower end of the fuel feed pipe 10 constantly immersed in the fuel remains in the inner chamber 12.

FIGS. 5 to 8 illustrate a second embodiment of the tank according to the invention. In these Figures, the parts common to FIGS. 1 to 4 are indicated with the same reference numerals.

The main difference with respect to the embodiment illustrated in FIGS. 1 to 4 lies in the fact that, in this case, the inner baffle wall 11 is in the form of a continuous annular wall. This wall is defined by two annular ribs 18, 19 welded together along their contacting edges.

In this case, also the said ribs have a V-shaped section and correspond to two annular grooves 20, 21 formed in the outer surfaces of the upper wall 6 and the lower wall 7 of the tank.

The edge of the lower rib 19 which contacts the upper rib 18 has two diametrically opposite recesses 22, whilst the corresponding edge of the upper rib 18 has a recess 23 (see FIG. 8). These recesses define the aperture which put the inner chamber 12 into communication with the remaining part of the tank 1. Both the ribs 13a, 14a and 13b, 14b of the embodiment illustrated in FIGS. 1 to 4, and the ribs 18, 19 of the embodiment illustrated in FIGS. 6 to 8, as well as serving to resist displacements of the fuel within the tank towards the peripheral zone thereof during movement of the vehicle, also serve as reinforcing ribs.

From the preceding description it is apparent that the tank according to the present invention guarantees the constant supply of fuel to the engine of the motor vehicle and, at the same time, has a simple and light structure which can be made economically.

Naturally, the details of construction can be widely varied with respect to what has been described and illustrated by way of example.

I claim:

1. A fuel tank for a motor vehicle comprising a plastic upper shell having a main upper wall and a peripheral side wall, a plastic lower shell having a main lower wall and a peripheral side wall disposed in abutting engagement with and welded to the side wall of said upper shell, outlet means defining a centrally located aperture in said main upper wall adapted to receive a fuel feed pipe for supplying fuel to a motor vehicle engine, a first pair of semi-annular ribs extending into said tank from said main upper wall on opposite sides of said outlet means, a second pair of semi-annular ribs extending into said tank from said main lower wall into engagement with said first pair of ribs to provide a pair of semi-annular baffle walls which define a substantially cylindrical chamber for the reception of said fuel feed pipe, the ends of said semi-annular baffle walls being offset with one end of each semi-annular baffle wall opposing the concave surface of the other semi-annular baffle wall to define a pair of restricted passages for communicating said chamber with the remaining part of said tank to reduce the effect of transverse and longitudinal accelerations and decelerations on the fuel in said tank.

2. A fuel tank as set forth in claim 1 wherein said ribs have a V-shaped section and correspond to grooves formed in the outer surfaces of the upper and lower walls of said tank.

* * * * *